Sept. 22, 1931.  A. M. J. POHL ET AL  1,824,295
OVERLOAD VEHICLE SPRING
Filed Oct. 2, 1929

Inventors
Albert M.J. Pohl
Arthur A. Pohl
By Glenn L. Fish
Attorney

Patented Sept. 22, 1931

1,824,295

UNITED STATES PATENT OFFICE

ALBERT M. J. POHL AND ARTHUR A. POHL, OF SPOKANE, WASHINGTON

OVERLOAD VEHICLE SPRING

Application filed October 2, 1929. Serial No. 396,742.

Our invention relates to overload vehicle springs and certain objects of the invention are to provide in combination with the axle housing and body frame of a vehicle novel clamping and securing means for fastening the spring to the axle housing, means whereby the spring and its associated parts is adapted to be attached to motor trucks of standard make such as the Ford Double A one ton truck, and means for preventing frictional wear of the vehicle frame body.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1:
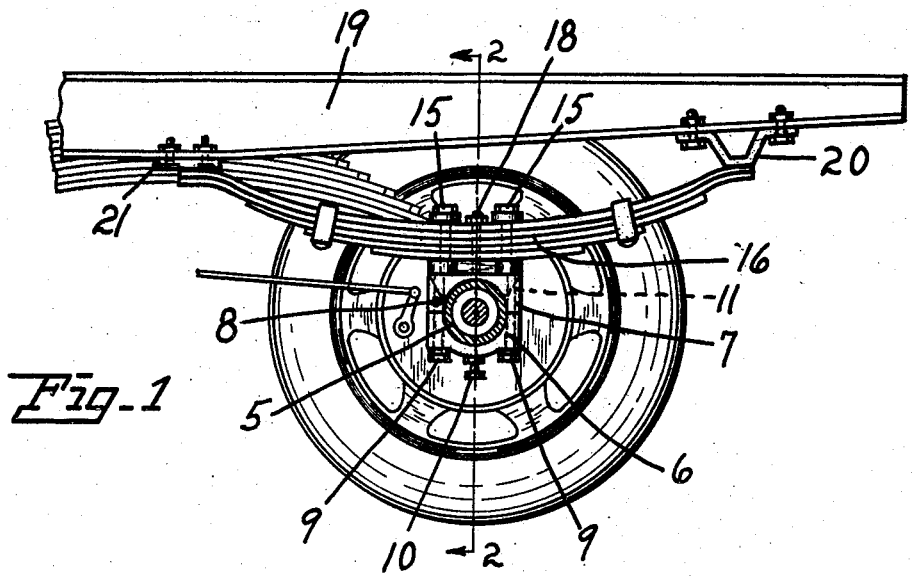
Figure 1 is a view partly in side elevation and partly in vertical section showing the rear portion of a motor truck with the overload spring mounted on the axle housing and chassis thereof.

Referring to the drawings throughout which like reference numerals designate like parts, the numeral 5 indicates the axle housing of a motor vehicle. A clamping block comprising a lower member 6 and an upper member 7 is provided with complementary halves of an annular opening 8 that is adapted to fit snugly around said axle housing as will be understood.

When said clamping block is installed in place around the axle housing 5 the lower block member 6 is secured to the upper block member 7 by means of lag bolts 9 that pass through said lower member and are threaded into said upper member. A set bolt 10 passes threadedly through the bottom of said lower member and engages the axle housing whereby any slack or play between the clamping block and axle housing may be eliminated.

Figure 2:
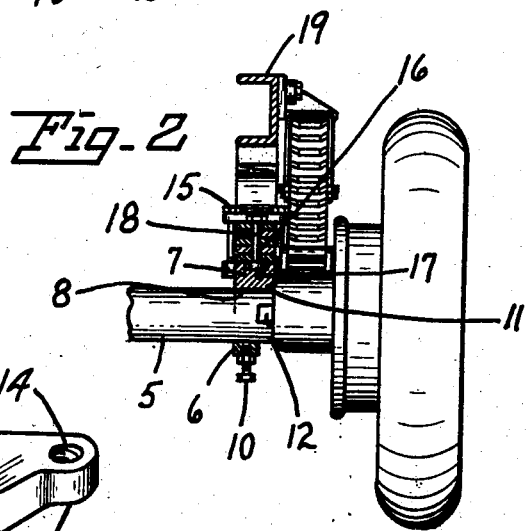
Fig. 2 is a view in transverse vertical section taken substantially on a broken line 2, 2 of Fig. 1.
Figure 3:
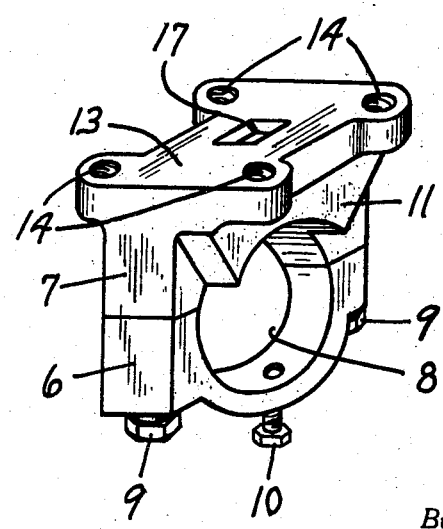
Fig. 3 is a detail view in perspective of the clamping block support for the spring.

The upper clamping block member 7 is provided with a shoulder or offset portion 11 which provides a larger bearing surface for the underside of said upper member in its engagement with the axle housing 5. Furthermore this shoulder is provided in reducing the thickness of the lower portion of said upper member and the lower member for the purpose of providing space for a lug as shown at 12 in Fig. 2 that is usually formed at this particular point on axle housings of trucks on which our device is especially adapted for use. A still further object in providing said shoulder or offset is that the upper portion of said upper block member may be secured in vertical alignment with the truck chassis or frame member 19 as clearly shown in Fig. 2 of the drawings.

The upper base or rest portion 13 of the block member 7 is provided with lug expanded corners having threaded holes 14. Said holes are adapted to receive the threaded ends of lag bolts 15 that are used for the purpose of securing the spring 16 on and against said base or rest block portion. A recess or hole 17 is provided in said base to provide space for receiving the head of a bolt 18 that is ordinarily used for securing the leaves of the spring together.

Owing to the taper of the chassis or body frame member 19 a bracket member 20 is secured thereto and serves as a rest for the rear end of the spring 16 and a plate 21 is likewise secured to said frame at a point whereby it serves as a rest for the forward end of said spring. Said bracket and plate serve as friction rests for said spring and thus prevent wear of the frame as will be understood.

Having thus described our invention what we claim and desire to secure by Letters Patent of the United States is:—

The combination with the axle housing and body frame of a vehicle of an overload vehicle spring comprising a clamping block, said block comprising an upper and a lower member each having complementary parts of an annular opening adapted to receive the vehicle axle housing, means for securing said block members around the axle housing, means for locking the lower block member to the axle housing, a shoulder for the upper block member arranged to increase the bearing surface of said member and adapted to provide space for a lug on the axle housing whereby the clamping block may be disposed in vertical alignment with the body frame, said upper block having a recess in its upper surface, a vehicle spring resting on the upper surface of said upper member, said recess adapted to receive the head of the holding bolt for the spring leaves, bolts for securing the spring to the upper block, and plates secured to the body frame for preventing frictional wear of the body frame by the ends of the vehicle spring which bear against said plates when the vehicle is unloaded.

In testimony whereof we affix our signatures.

ALBERT M. J. POHL.
ARTHUR A. POHL.